United States Patent
Carlson et al.

(10) Patent No.: US 7,177,145 B2
(45) Date of Patent: Feb. 13, 2007

(54) CARRIER DEVICE AND METHOD FOR A MULTIPLE DISC ARRAY

(75) Inventors: Grant Edward Carlson, Florissant, CO (US); Karl Heinz Cunha, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/817,378

(22) Filed: Apr. 2, 2004

(65) Prior Publication Data

US 2005/0219810 A1    Oct. 6, 2005

(51) Int. Cl.
*H05K 5/00* (2006.01)

(52) U.S. Cl. .................. 361/685; 710/56; 711/114

(58) Field of Classification Search ........ 361/679–687, 361/724–727; 710/38, 56; 711/112, 114; 568/910

See application file for complete search history.

(56) References Cited

U.S. PATENT DOCUMENTS

| | | | |
|---|---|---|---|
| 3,725,883 A | 4/1973 | Bennett et al. | |
| 4,754,397 A | 6/1988 | Varaiya et al. | |
| 5,124,886 A | 6/1992 | Golobay | |
| 5,247,427 A | 9/1993 | Driscoll et al. | |
| 5,517,373 A | 5/1996 | Hanson | |
| 5,729,763 A | 3/1998 | Leshem | |
| 5,752,257 A | 5/1998 | Ripoll et al. | |
| 5,822,184 A * | 10/1998 | Rabinovitz | 361/685 |
| 5,828,547 A | 10/1998 | Francovich et al. | |
| 5,913,926 A * | 6/1999 | Anderson et al. | 714/6 |
| 5,973,879 A * | 10/1999 | Raffetto et al. | 360/98.08 |
| 5,974,490 A | 10/1999 | Fujimura et al. | |
| 6,076,142 A | 6/2000 | Corrington et al. | |
| 6,230,217 B1 | 5/2001 | Tuccio et al. | |
| 6,243,790 B1 * | 6/2001 | Yorimitsu | 711/112 |
| 6,351,374 B1 | 2/2002 | Sherry | |
| 6,397,293 B2 | 5/2002 | Shrader et al. | |
| 6,442,022 B1 | 8/2002 | Paul | |
| 6,464,509 B1 | 10/2002 | Emberty et al. | |
| 6,574,687 B1 * | 6/2003 | Teachout et al. | 710/38 |

(Continued)

FOREIGN PATENT DOCUMENTS

EP    1026688 A3    8/2000

(Continued)

*Primary Examiner*—Hung Van Duong
(74) *Attorney, Agent, or Firm*—Fellers, Snider, et al.

(57) ABSTRACT

A carrier for supporting a circuit board and one or more data storage devices in a multiple disc array assembly. The carrier includes a partition with channel surfaces defining a tubular closed passage. The channel surfaces are adapted for circumscribing a cross section of the data storage device in a supporting mating relationship. The carrier further includes means for urging a data storage device in the passage in pressing engagement against the circuit board. Furthermore, a method for supporting a plurality of data storage devices in the multiple disc array. The method includes providing a carrier from a plurality of different carriers differentiated by a characteristic array of tubular closed channels for supportingly engaging data storage devices; inserting one or more data storage devices in a respective number of channels defining the multiple disc array; and inserting the carrier in a shelf. The method can further include removing the carrier from the shelf; changing the multiple disc array configuration; and re-inserting the carrier in the shelf.

21 Claims, 15 Drawing Sheets

U.S. PATENT DOCUMENTS

| | | |
|---|---|---|
| 6,618,246 B2 | 9/2003 | Sullivan et al. |
| 6,651,138 B2 | 11/2003 | Lai et al. |
| 6,683,793 B1 | 1/2004 | Campbell et al. |
| 6,906,914 B2 * | 6/2005 | Stamos et al. ............... 361/683 |
| 6,924,401 B2 * | 8/2005 | Giapis et al. ................ 568/910 |
| 2002/0144044 A1 | 10/2002 | Moon et al. |
| 2003/0041201 A1 | 2/2003 | Rauscher |
| 2003/0070043 A1 | 4/2003 | Merkey |
| 2003/0081378 A1 | 5/2003 | Debbins et al. |
| 2004/0057203 A1 | 3/2004 | Rabinovitz |

FOREIGN PATENT DOCUMENTS

| | | |
|---|---|---|
| WO | WO 97/45784 | 12/1997 |
| WO | WO 99/60832 | 11/1999 |

* cited by examiner

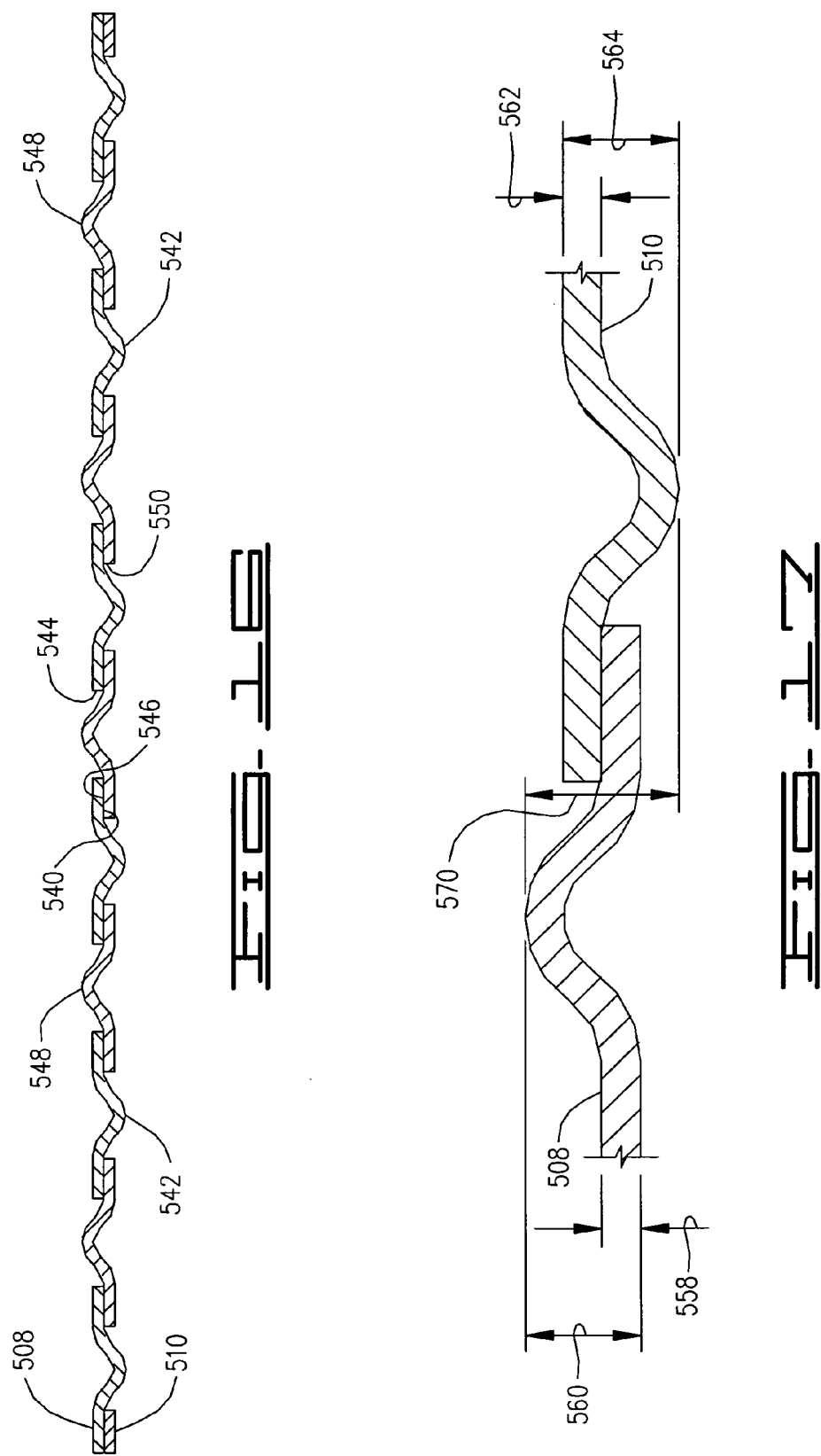

CARRIER DEVICE AND METHOD FOR A MULTIPLE DISC ARRAY

FIELD OF THE INVENTION

The embodiments of the present invention relate generally to the field of array storage systems and more particularly but without limitation to a carrier for convertibly componentizing various numbers and sizes of data storage devices in a multiple disc array.

BACKGROUND

Ever-increasing demand for data storage capacity has fostered the development of improved data array storage systems wherein a plurality of data storage devices are electronically linked to function synergistically. Data integrity schemes are also enhanced in such arrays permitting fail-safe redundant storage of data, such as in redundant arrays of inexpensive device ("RAID") systems.

There are a number of challenges facing the array designer. For example, the many and complex mechanical and electrical connections required for each data storage device are multiplied by the number in an array. That is, each and every data storage device requires sufficient mechanical support to isolate the delicate head and disc components from vibration levels that create data transfer errors. Not only must attention be paid to self-excitation, that is, vibration caused by the rotating disc of a data storage device itself, but like attention is required to external excitation sources in such an environment. External excitation can come from other data storage devices in the array, electrical components in the array such as power supplies and fans, and from the installation and/or removal of data storage devices while the array is operational.

As the number of data storage devices in arrays increases, the problems associated with electromagnetic interference containment are exacerbated as well. Properly shielding the data storage devices requires attention paid not only to leak paths between drives in adjacent shelves, but also to the leak paths potentially created by the multiple openings into which each of the plurality of data storage devices is inserted. Adequate shielding of these openings must be provided while still permitting the ability to insert and/or remove a data storage device without disrupting the shielding in place for adjacent data storage devices in the array.

Flexibility can be a problem as well. For instance, traditionally the electrical systems, such as the connector boards, controllers, and connecting buses, are hard-wired for a predetermined number and size of data storage devices in the array. This is required to maintain the electrical integrity of the array while permitting repeated hot-swapping of individual data storage devices. For this reason, the storage shelves and the associated electrical systems are conventionally dedicated for the predetermined number and size of data storage devices. Accordingly, because of both mechanical and electrical constraints, an array designed for a particular form factor configuration cannot readily be adapted for use with a different form factor. Also, if a grouping of data storage devices is needed for a particular function, such as mirroring the storage of data, such functionality must conventionally be achieved at the top level host programming level. This requires complex and coordinated programming of many data storage devices.

While various approaches have been proposed in the art to address maximizing the data storage capacity while also providing operable flexibility in the utilization of data storage devices in array storage systems, there nevertheless remains a continued need for improvements in the art. It is to such improvements that the claimed invention is directed.

SUMMARY OF THE INVENTION

In accordance with preferred embodiments of the present invention, an apparatus and method are contemplated for convertibly componentizing data storage devices in a multiple disc array.

In some preferred embodiments an array storage system is provided comprising a multiple disc array comprising a carrier from a plurality of different carriers. The carriers are differentiated by a characteristic array of tubular closed channels, each channel being adapted for supportingly engaging a data storage device.

In other preferred embodiments a multiple disc array is provided. The multiple disc array comprises a partition comprising channel surfaces defining a tubular closed passage. A circuit board is disposed in a plane substantially orthogonal to the passage. A data storage device is disposed in the passage, the channel surfaces circumscribing a cross section of the data storage device in a supporting mating relationship. The multiple disc array further comprises means for urging the data storage device against the circuit board.

In other preferred embodiments a carrier is provided for supporting a circuit board and one or more data storage devices in a multiple disc array. The carrier comprises a partition comprising channel surfaces defining a tubular closed passage. The channel surfaces are adapted for circumscribing a cross section of the data storage device in a supporting mating relationship. The carrier further comprises means for urging a data storage device in the passage in pressing engagement against the circuit board.

In other preferred embodiments a method is provided for supporting a plurality of data storage devices in a multiple disc array. The method comprises providing a carrier from a plurality of different carriers differentiated by a characteristic array of tubular closed channels for supportingly engaging data storage devices; inserting one or more data storage devices in a respective number of channels defining the multiple disc array; and inserting the carrier in the shelf. The method can further comprise removing the carrier from the shelf; changing the multiple disc array configuration; and re-inserting the carrier in the shelf.

These and various other features and advantages which characterize the claimed invention will become apparent upon reading the following detailed description and upon reviewing the associated drawings.

BRIEF DESCRIPTION OF THE DRAWINGS

FIGS. 16 and 17 are partial cross sectional views taken generally along the section line 16—16 of FIG. 13.

DETAILED DESCRIPTION

Figure 1:
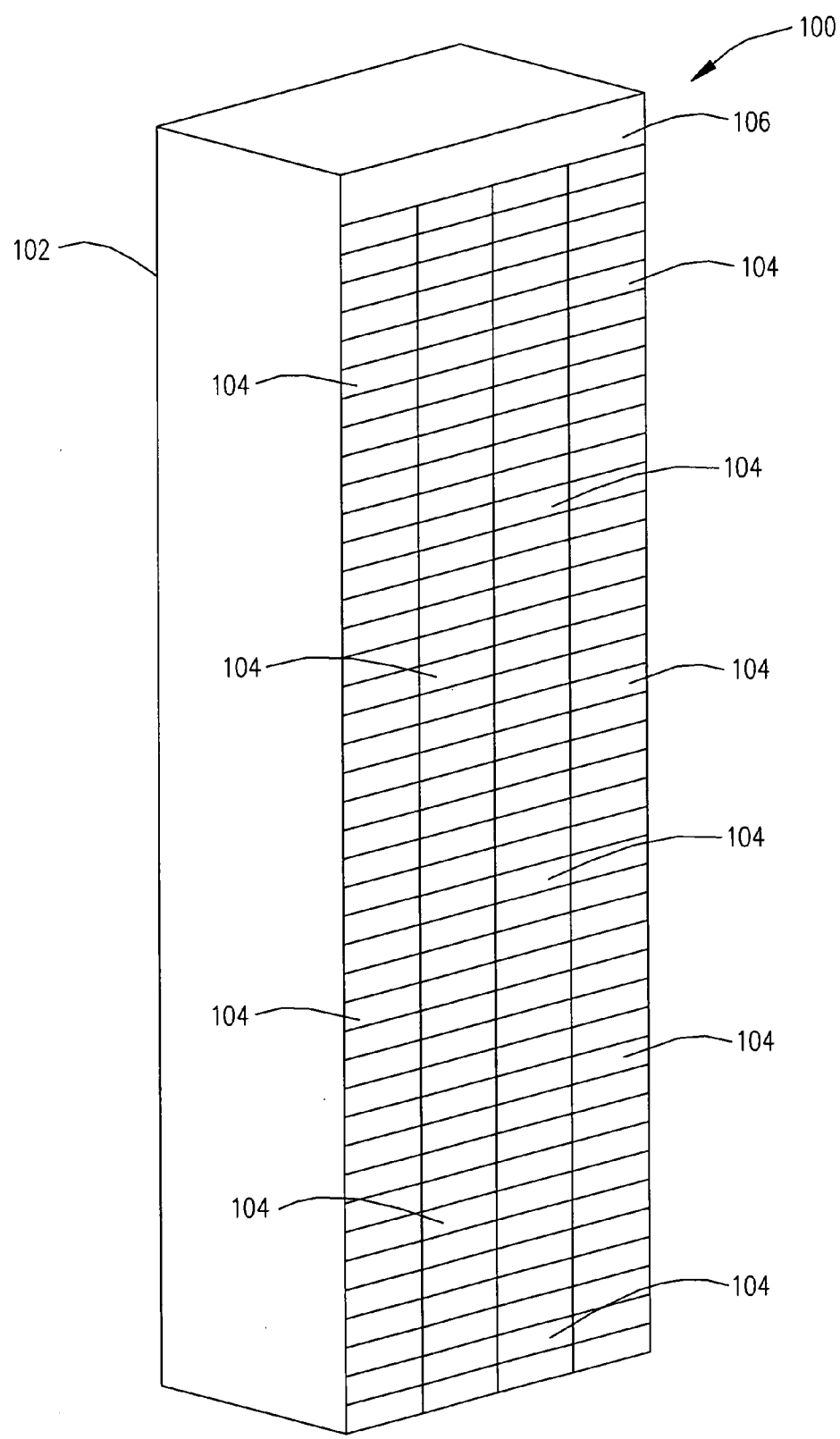
FIG. 1 is an isometric view of an array storage system constructed in accordance with related art solutions.

FIG. 1 is an isometric view of a related art array storage system 100 wherein a cabinet 102 supports a plurality of data storage devices 104. A host 106 is electrically connected to each of the data storage devices 104 so as to provide a bulk data storage arrangement, such as for providing a network interface and/or for employing data integrity schemes such as in a RAID system.

Figure 2:
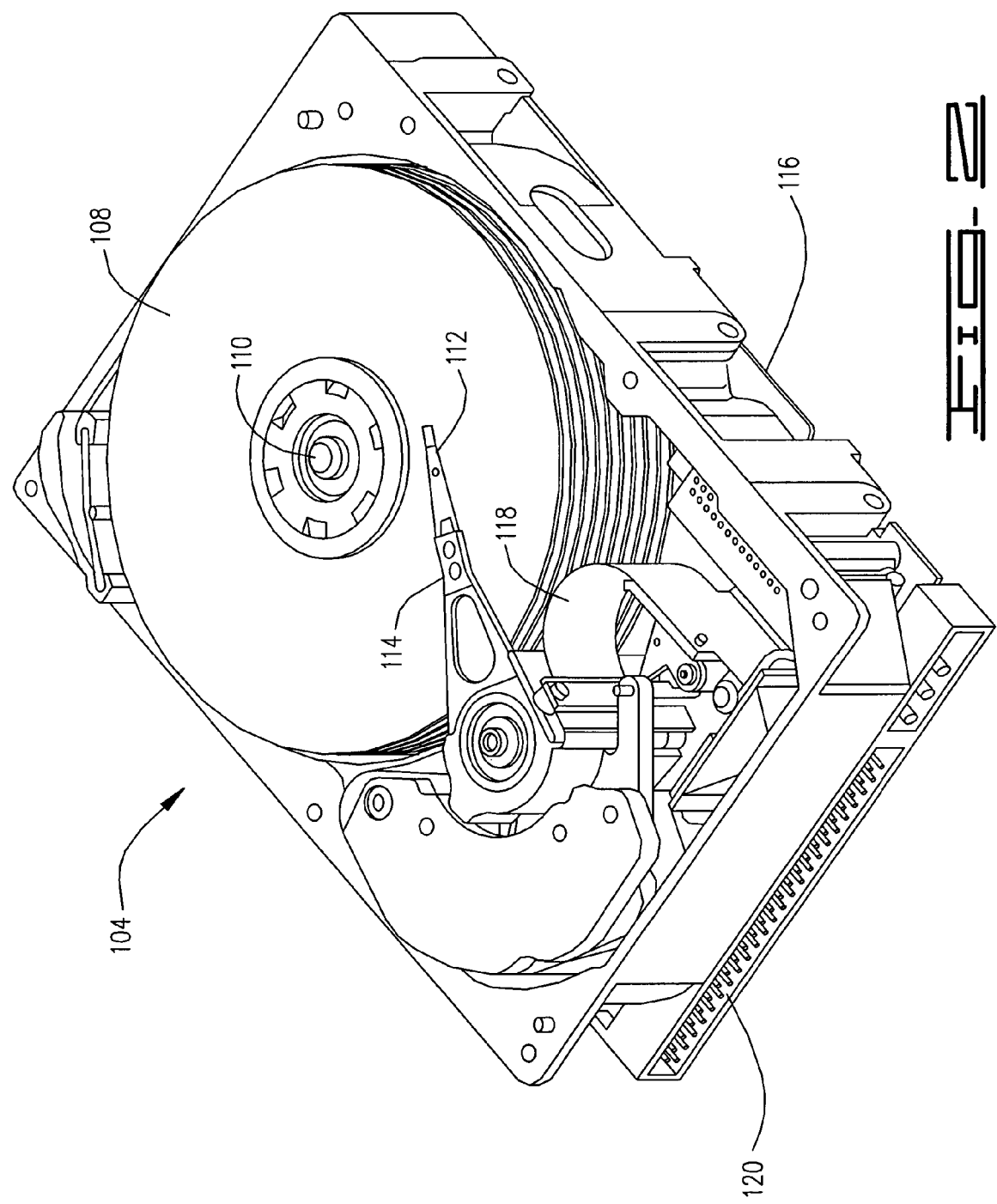
FIG. 2 is an isometric view of a data storage device.

FIG. 2 is an isometric view of a data storage device 104 suited for use with the present invention and in the form of a rotating magnetic media disc drive. A data storage disc 108 is rotated by a motor 110 to present data storage locations of the disc 108 to a read/write head ("head") 112. The head 112 is supported at the distal end of a rotary actuator 114 that is capable of moving the head 112 radially between inner and outer tracks of the disc 108. The head 112 is electrically connected to a circuit board 116 by way of a flex circuit 118. The circuit board 116 is adapted to receive and send control signals controlling the functions of the data storage device 104. A connector 120 is electrically connected to the circuit board 116, and is adapted for connecting the data storage device 104 with control electronics of the array 100.

The array storage system 100 offers one way of combining the storage capability of a number of data storage devices 104. Typically, however, the individual openings in the cabinet 102 are sized and wired to receivingly engage either individual data storage devices 104, or a fixed number and size of data storage devices 104.

Figure 3:
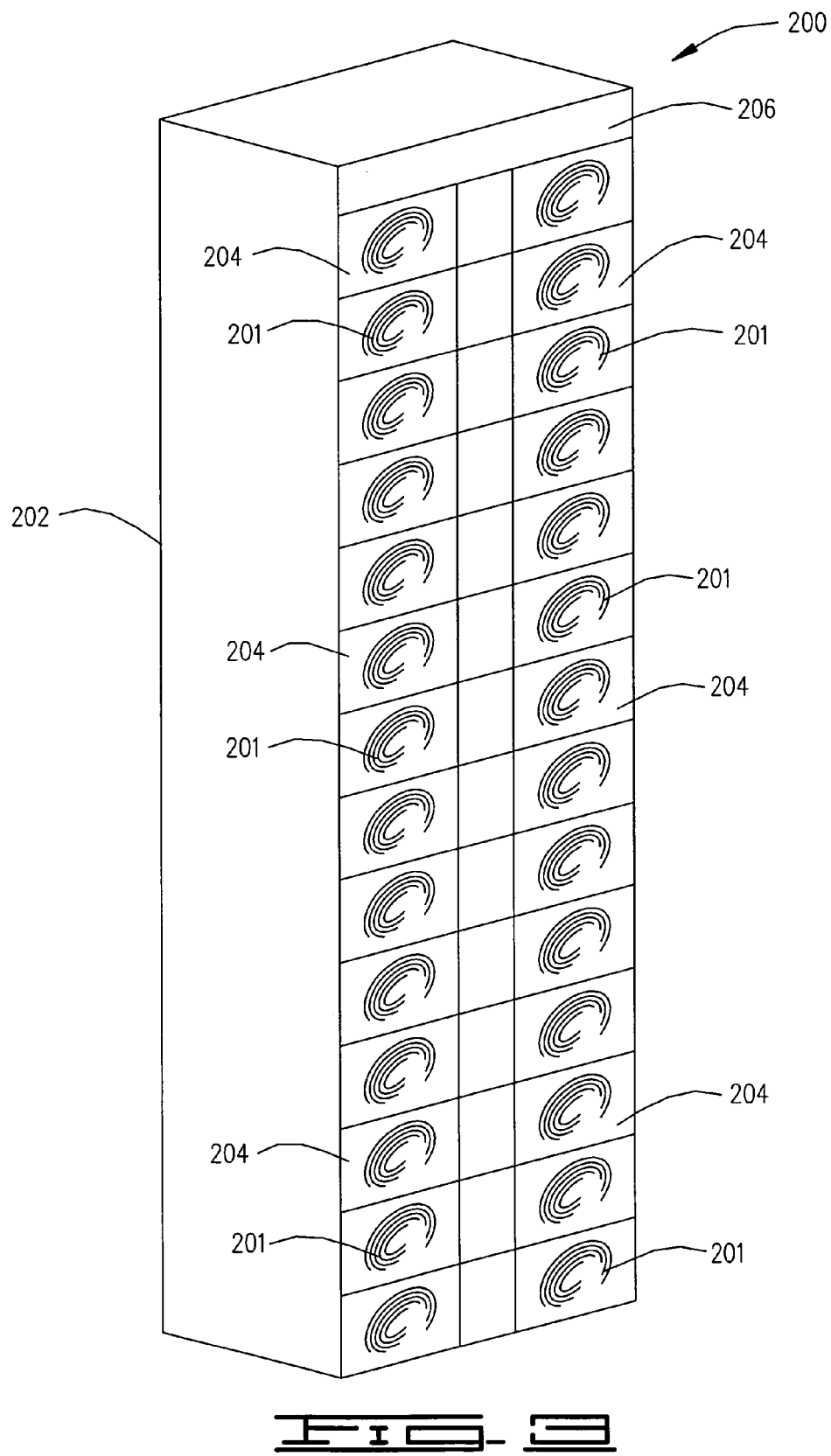
FIG. 3 is an isometric view of an array storage system constructed in accordance with embodiments of the present invention.
Figure 4:
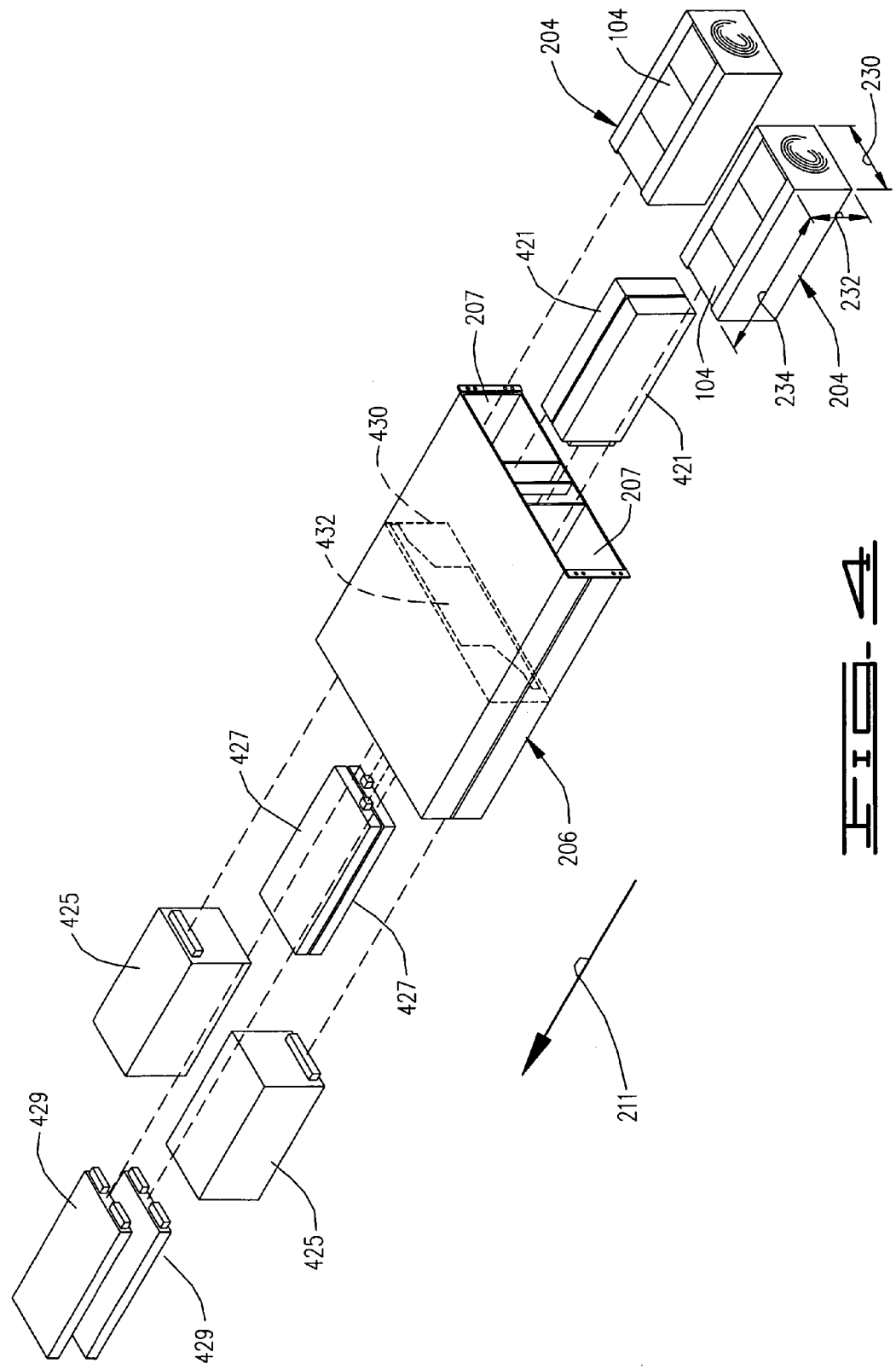
FIG. 4 is an exploded isometric view of portions of the array storage system of FIG. 3.

FIGS. 3 and 4 illustrate an array storage system 200 constructed in accordance with novel embodiments of the present invention, wherein a plurality of multiple disc arrays ("MDA") 201 are utilized. An MDA 201 generally comprises a convertible plurality of componentized data storage devices 104. By "convertible" it is meant that one or more data storage devices 104 can be readily replaced, added, or removed in an existing MDA 201, or that a different MDA can be utilized that is capable of supporting a different number, size or arrangement of data storage devices. By "componentized" it is meant that the data storage devices and associated control electronics in the MDA 201 are integrated so as to be functionally presented to the backplane as a single component.

A cabinet 202 defines a plurality of cavities into each of which a shelf 206 is receivingly engaged. Each shelf 206 defines one or more cavities 207 into each of which a carrier 204 is receivingly engaged. In the illustrative embodiment of FIG. 4, the shelf 206 defines two cavities 207 for receiving two carriers 204. Equivalent alternative embodiments contemplate a different number of carriers 204 per shelf 206.

This solution generally provides an array storage system 200 comprising a plurality of carriers 204, each sized in accordance with the respective cavity 207 for an operable mating relationship. Each carrier 204 is adapted to operably support a variable number, size, or arrangement of data storage devices 104. More particularly, this solution provides an array storage system 200 comprising a shelf 206 for receivingly engaging a carrier 204 from a plurality of different carriers, each carrier of the plurality having common exterior dimensions defining an operable mating relationship with the cavity 207 of the shelf 206, and each carrier of the plurality differentiated by interior supporting features for supporting a selected number, size, or arrangement of data storage devices 104.

Figure 5:
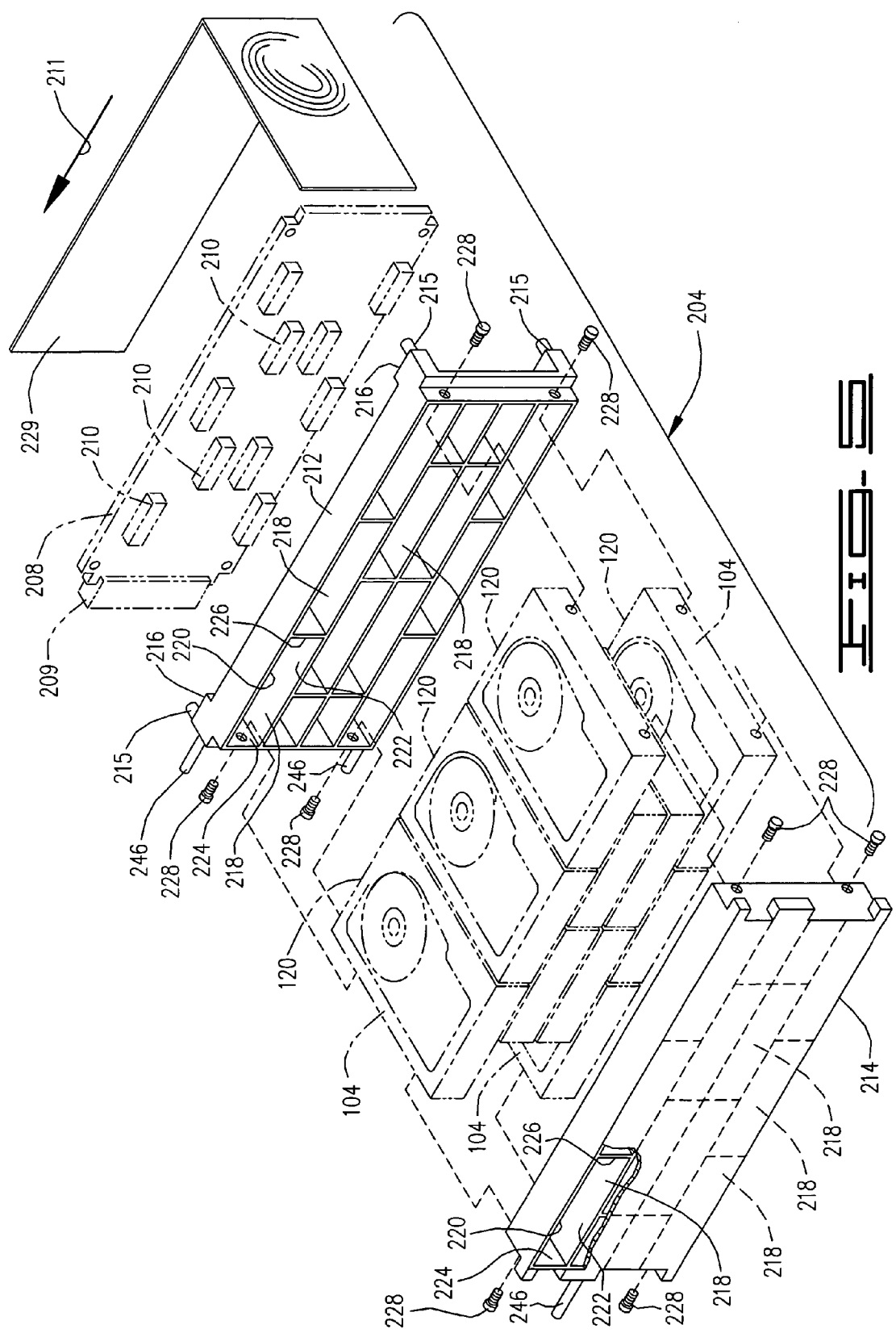
FIG. 5 is an exploded isometric view of the carrier portion of FIG. 4.

FIG. 5 is an exploded isometric view illustrating the carrier 204. It is receivingly engageable within one cavity 207 of the shelf 206 (FIG. 4) which is, in turn, receivingly engageable within the cavity of the cabinet 202 (FIG. 4). In some embodiments of the present invention, the shelf 206 is fixed within the cabinet 202 and the carrier 204 is insertable and removable from the shelf 206 so that individual data storage devices 104 can be readily added, removed or replaced. In other embodiments of the present invention, a carrier 204 can be replaced with another carrier having different data storage device supporting features for electrically connecting a different selected number, size, or arrangement of data storage devices 104 in the shelf 206.

The carrier 204 supports a circuit board 208 and one or more data storage devices 104. The circuit board 208 has a number of connectors 210 arranged to align with the connector 120 of the respective data storage device 104. The circuit board 208 preferably further comprises a connector 209 that is adapted to connect to the electronics of the array storage system 200 through a backplane (discussed below). It will be noted that in the illustrative arrangement of FIG. 5, the connector 209 is aligned for an operable connection with the backplane by moving the circuit board 208 in a direction 211 along the longitudinal depth of the shelf 206 (FIG. 4). In this manner, the electrical connection between the circuit board 208 and the array storage system 200 is readily made as a result of inserting the carrier 204 into the shelf 206 (FIG. 4). The circuit board 208 is selectively configured such that upon operative insertion of the carrier 204, the host 106 can be placed in electrical communication with each and every data storage device 104 in the MDA 201, and the data storage devices 104 can be in electrical communication with other data storage devices 104 both inside and outside a particular MDA 201.

In embodiments contemplated in FIG. 5 and below, the carrier 204 comprises a two-piece construction wherein the data storage devices 104 are sandwiched between a partition member 212 and an opposing cap member 214. This construction has been determined to offer advantageous manufacturing and component cost benefits. The partition 212 and cap 214 in this illustrative arrangement are well suited for manufacture by conventional die casting methodology to provide relatively inexpensive yet structurally robust component parts. Alternatively, the carrier 204 can comprise a unitary ("one-piece") construction or can comprise an assembly of more than two components.

The carrier 204 comprises a number of posts 215 that serve as stand-offs for locating and supporting the circuit board 208. Preferably, as shown in FIG. 5, four posts 215 are utilized to engage the corners of the circuit board 208. Each of the posts 215 defines a locating surface 216 at a distal end thereof, the plurality of locating surfaces 216 being disposed substantially coplanar in order to position the circuit board 208 substantially parallel with the partition 212.

The partition 212 comprises channel surfaces defining a number of channels 218, within each of which a data storage device 104 is slidingly engageable and operatively alignable with the circuit board 208. For example, the partition 212 comprises a first pair of opposing surfaces 220, 222 that are spaced-apart defining an operable mating relationship with a cross-sectional height of the data storage device 104. The partition comprises a second pair of opposing surfaces 224, 226 that are spaced-apart defining an operable mating relationship with a cross-sectional width of the data storage device 104. The two pair of opposing surfaces 220, 222 and 224, 226 thereby define a tubular closed passage circumscribing a cross section of a data storage device. A close mating relationship between the surfaces 220, 222 and 224, 226 and the data storage device 104 imparts a supporting engagement to the data storage device. This supporting relationship is such that lateral support is imparted to the data storage device 104 by the partition 212 in all directions. This is particularly beneficial in that the MDAs are intended to be moved about often in replacing or changing an MDA 201 arrangement.

In addition to the importance of the size of the channel 218, the location is also important in that it operatively aligns the connector 120 of the data storage device 104 with the respective connector 210 of the circuit board 208.

With the data storage device supportingly engaged within a channel 218 and aligned with its respective connector 210 on the circuit board 208, embodiments of the present invention contemplate a means for urging the data storage device 104 against the circuit board 208 for both mechanical and electrical integrity. Placing the data storage device 104 in compression attenuates operating vibrations. Also, urging the data storage device 104 toward the circuit board 208 ensures the connectors 120, 210 remain electrically connected, even in shock events associated with normal handling of the carrier 204.

One way of urging the data storage device 104 against the circuit board 208 is by using a fastener, such as screw 228, to attach the data storage device to the channel surface. For example, the location of clearance and take holes in the channel surface and data storage device, respectively, for a threaded fastener can be provided such that alignment of these holes for the fastener necessitates urging of the data storage device 104 against the circuit board 208. It will be noted in FIG. 5 that four such fasteners 228 are utilized in fastening both the partition 212 and the cap 214 to the data storage devices 104. It will likewise be noted, however, that such mechanical fasteners are not necessarily used for urging the data storage devices 104; see, for example in FIG. 5 that there are six channels with no such screw attachments. In those channels the cap 214, being positioned by attachment to some of the data storage devices 104, is positioned so as to pressingly engage and thereby urge the other data storage devices 104 against the circuit board 208.

In the two-piece construction of FIG. 5, the channel 218 defined by the partition 212 supportingly engages a proximal end of the data storage device 104 adjacent the circuit board 208. The channel 218 is continued in the cap 214 by discontinuous surfaces 220, 222 and 224, 226 that likewise supportingly engage a distal end of the data storage device 104.

In this arrangement the data storage devices 104 provide medial structural integrity to the carrier 204. Although not shown, in alternative equivalent embodiments the carrier can comprise a one-piece construction, or can be provided with attachment portions of the partition 212 and cap 214 for joining them together directly, or attachment linkages can be provided for doing so.

The carrier 204 can support a wrapper 229 for enclosing the data storage devices 104 and/or the circuit board 208 for electrical shielding. The illustrative wrapper 229 of FIG. 5 covers just the front and circuit board portions of the MDA 201.

The carrier of FIG. 5 defines ten channels 218 for receivingly engaging ten data storage devices 104. Referring back to FIG. 4, the assembled carrier 204 defines a cross-sectional width 230 and height 232, as well as a longitudinal depth 234. These exterior dimensions provide an operable mating relationship with the characteristic volumetric dimensions in the cavity 207 of the shelf 206. This operable mating relationship readily permits the attachment of shielding members as necessary to cover the gaps between the installed carrier 204 and the shelf 206.

Figure 6:
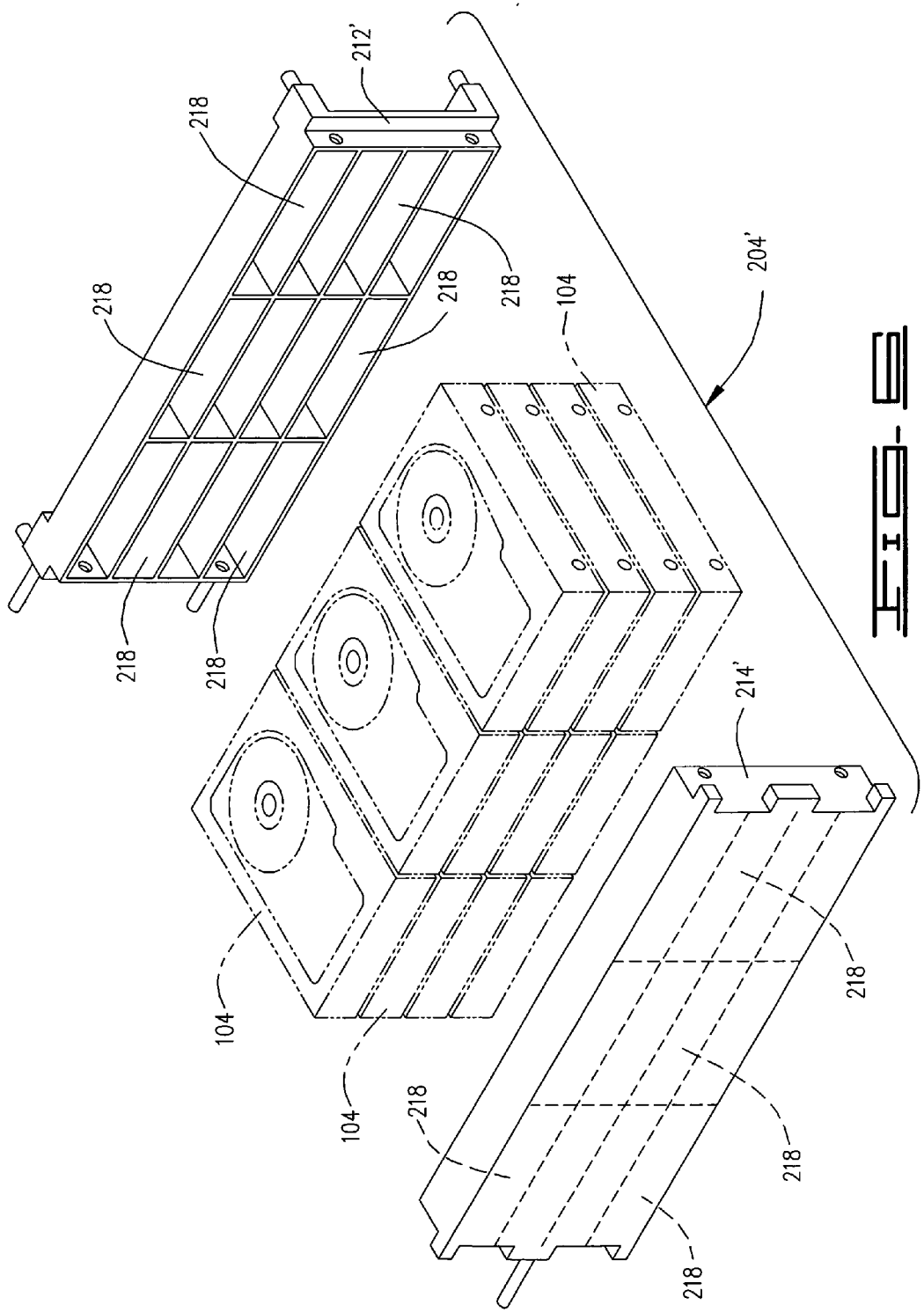
FIG. 6 is an exploded isometric view of a carrier constructed in accordance with alternative embodiments of the present invention.

FIG. 6 illustrates another carrier 204' comprising twelve channels 218 for supportingly engaging twelve data storage devices 104 rather than the ten of FIG. 5. Although the carrier 204' has different interior supporting features, when assembled the carrier 204' defines substantially the same volumetric dimensions 230, 232, 234 for a like operable mating engagement in the cavity 207 of the shelf 206.

The embodiments illustrated in FIGS. 5 and 6 illustrate embodiments wherein 10 and 12, respectively, data storage devices 104 characterized by a 3.5 inch form factor are componentized within the carrier 204, 204'. Where smaller data storage devices 104 are employed, the size of the channels 218 are smaller. For instance, in another embodiment, not shown, the carrier 204 can be provided with as many as twenty-four channels 218 for supportingly engaging the same number of data storage devices characterized by a 2.5 inch form factor. In further embodiments yet, the channels 218 can be appropriately sized to supportingly engage more than one size data storage device 104 in a carrier 204 simultaneously.

In the manner described, the data storage devices 104 are sandwiched between the partition 212 and the cap 214 within a channel 218. The cap 214 urges the data storage device 104 toward the circuit board 208 in order to supportingly engage the data storage device 104 and to positively retain the electrical connection between the connector 120 (of the data storage device 104) with the connector 210 (of the circuit board 208).

Figure 7:
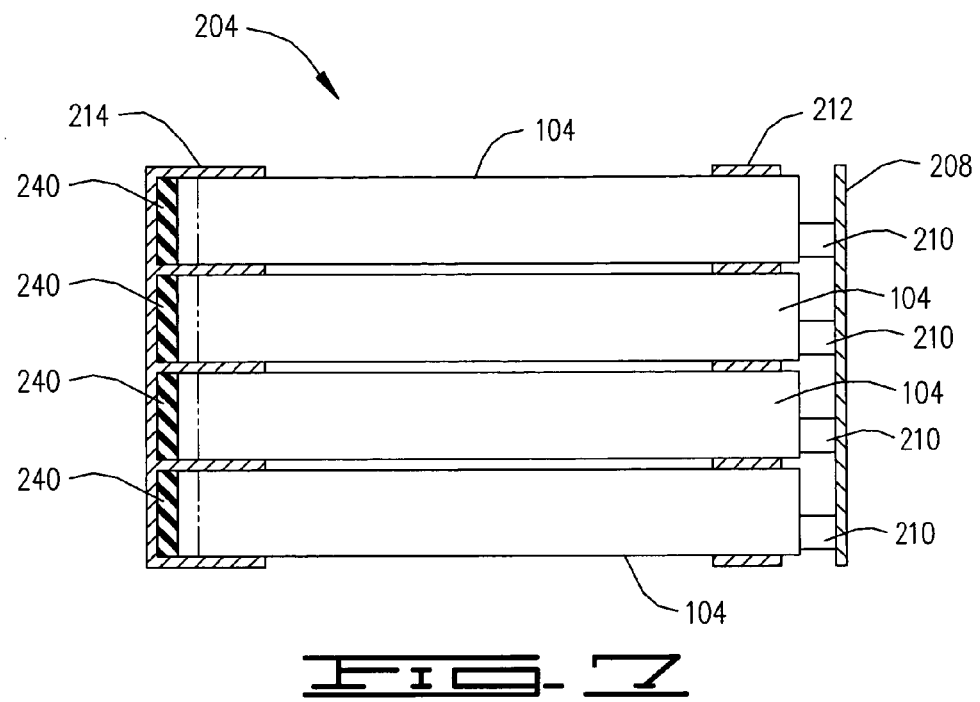
FIG. 7 is a partial cross-sectional view of the carrier of FIG. 5.
Figure 8:
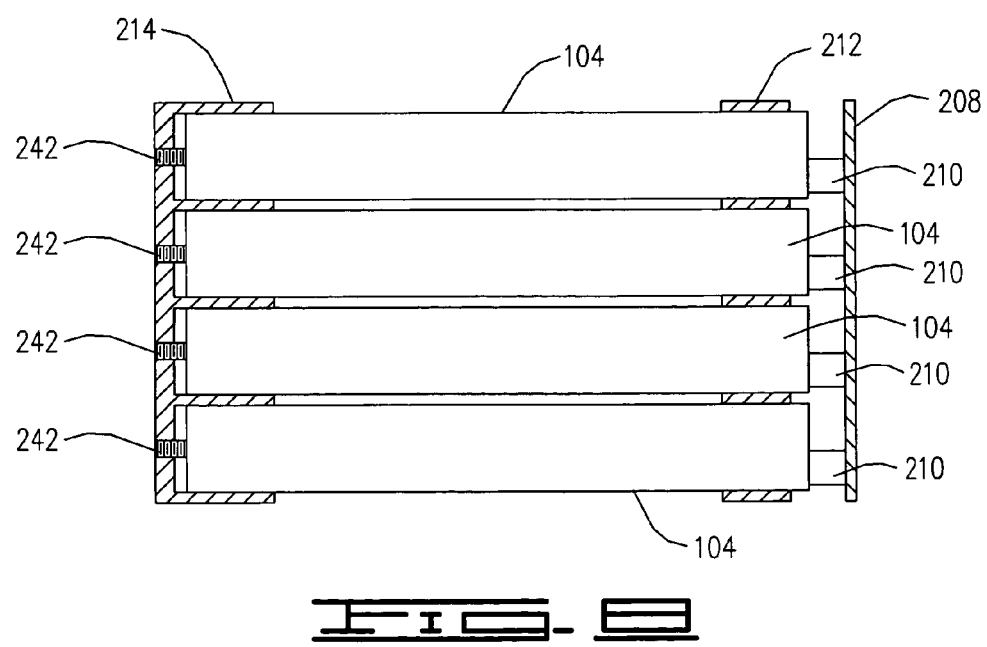
FIG. 8 is a partial cross-sectional view of a carrier constructed in accordance with alternative embodiments of the present invention.

As shown in FIG. 7, a resilient member 240 can be compressingly interposed between the cap 214 and the distal end of the data storage device 104. The broken lines represent the uncompressed size of the resilient members 240. The resilient member 240 remains in compression to aid in positively urging the data storage device 104 against the circuit board 208 as discussed above. In other alternative embodiments shown in FIG. 8, a threaded fastener 242, such as a set screw, can pass through the cap 214 and be compressingly engaged against the distal end of the data storage device 104 to urge it against the circuit board 208.

The carrier 204 preferably comprises one or more guide members that are adapted for aligning with mating features in the backplane to positively align the carrier 204 during insertion. In FIG. 5, for example, a three-point positive alignment is accomplished by providing two alignment pins 246 depending from the leading edge of the partition 212 and a third alignment pin 246 likewise depending from the cap 214.

Figure 9:
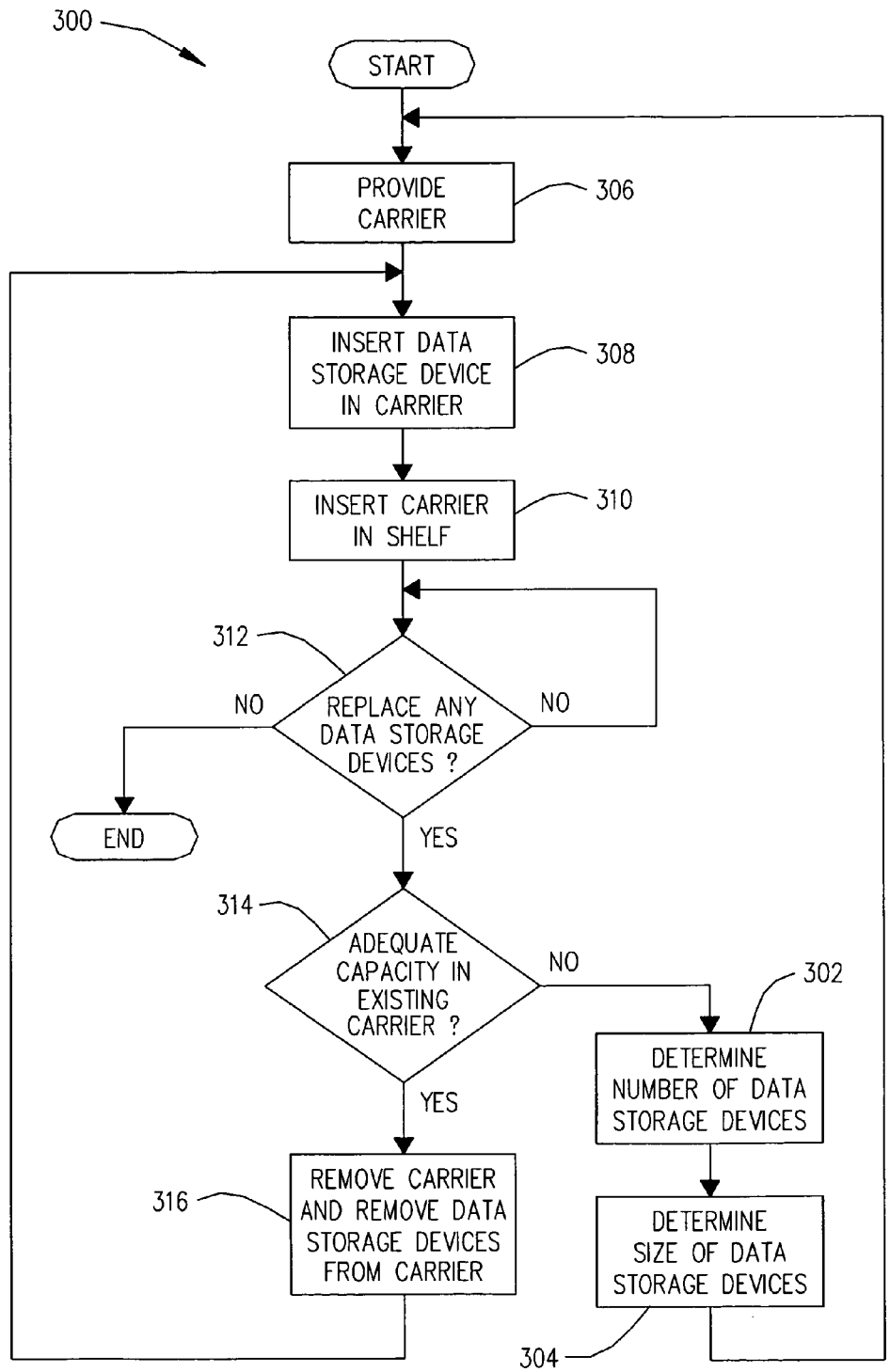
FIG. 9 is a flow diagram of a method for componentizing a selected number and size of data storage devices as a multiple disc array in accordance with embodiments of the present invention.

FIG. 9 is a flow chart of illustrative steps for a method 300 for supporting a plurality of data storage devices in an MDA 201 in accordance with embodiments of the present invention. The method 300 initially determines the number of data storage devices desired in step 302 and the size of the data storage devices desired in step 304. From these determinations, an appropriately configured carrier can be selected in step 306. It will be noted that the number and size of the channels do not have to exactly match the number and size of data storage devices desired; rather, a carrier with currently unused channels 218 can be used in future expansion of capacity by adding more data storage devices 104 in the same carrier 204.

The data storage devices 104 are inserted into the carrier 204 in step 308, and then the carrier 204 is inserted into the shelf 206 in step 310. Decision step 312 determines whether any presently employed data storage devices 104 need to be changed, such as for maintenance, repair, archiving or the like. If yes, then decision block 314 determines whether there is an adequate capacity of supporting channels 218 in the presently used carrier 204. If yes, such as when one data storage device 104 is being replaced with an identical one, then in step 316 the carrier 204 is removed from the shelf 206 and one or more data storage devices 104 are removed from the carrier 204. The method then returns to step 308 where one or more data storage devices 104 are inserted into the carrier.

If the determination of step 314 is no, then a differently configured carrier is needed. The method returns to step 302 and 304 which define the appropriate carrier, and the method returns to the providing the carrier step 306.

Figure 10:
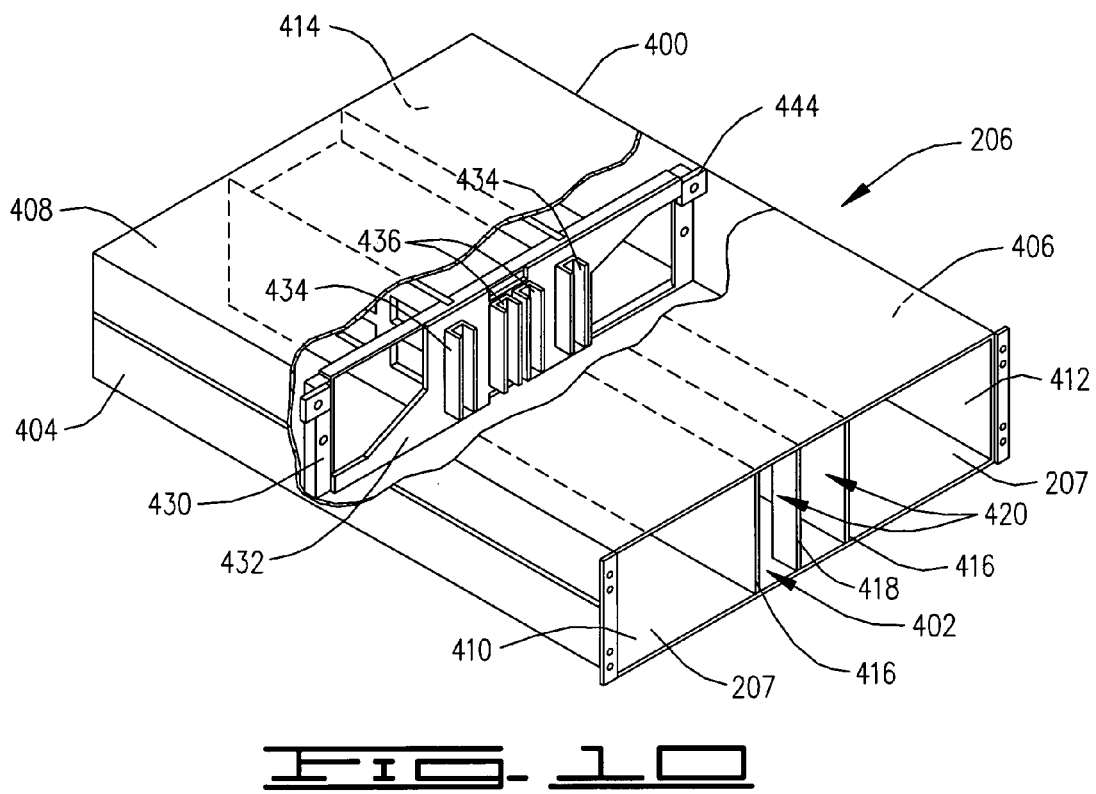
FIGS. 10 and 11 are front and rear isometric views, respectively of the shelf of FIG. 4.
Figure 11:
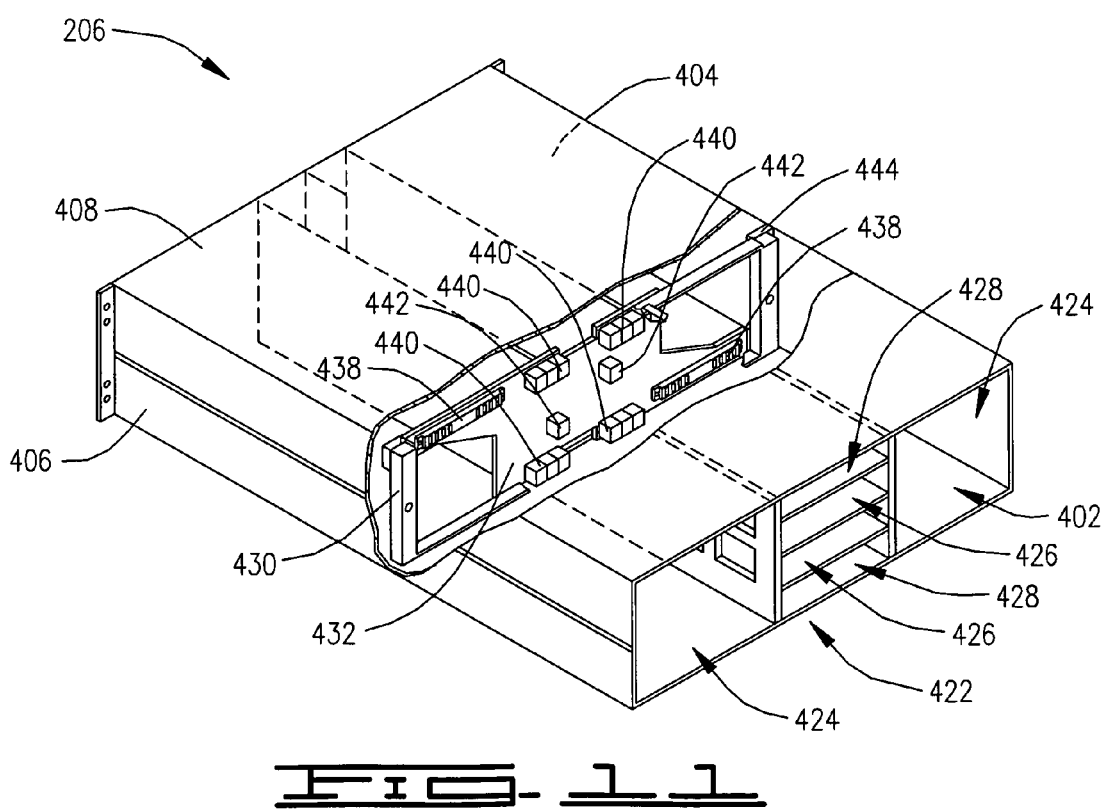
Figure 12:
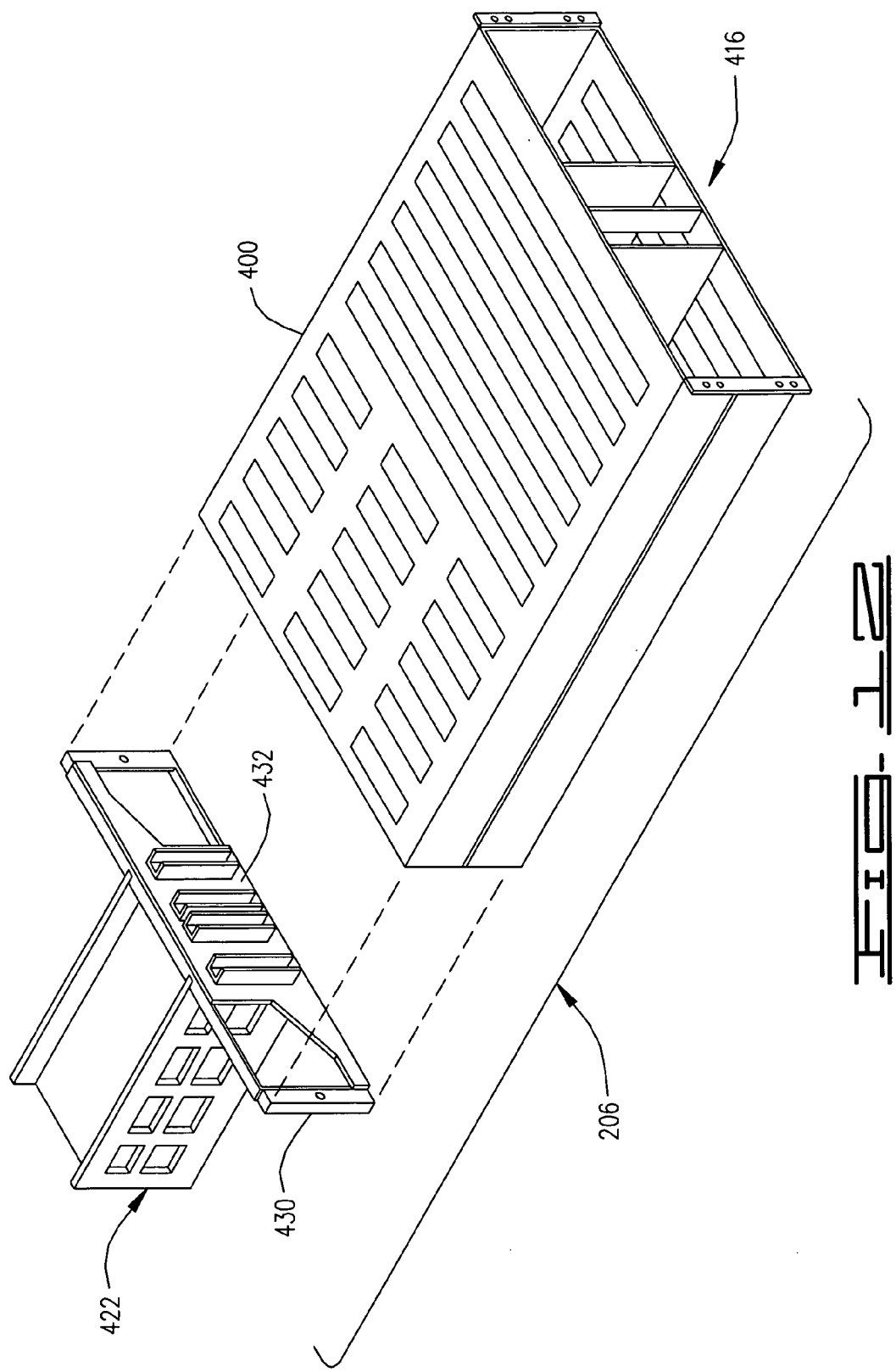
FIG. 12 is an exploded isometric view of the shelf of FIGS. 10 and 11 constructed in accordance with embodiments of the present invention.

Turning now to FIGS. 10–12 for a more particular discussion of the shelf 206. FIG. 10 is a front isometric view of the shelf 206 comprising an enclosure 400 defining a tubular closed passage 402. That is, for electrical shielding purposes, the enclosure 400 preferably comprises a first pair of opposing sides 404, 406 and a second pair of opposing sides 408, 410 that are joined to define the tubular closed passage 402 defining a frontend opening 412 and an opposing backend opening 414.

The cavity 207 for receivingly engaging the carrier 204 is defined by a frontend partition 416, and in this illustrative case, in cooperation with the enclosure 400. In the illustrative embodiment of FIG. 10, and elsewhere herein, the partition 416 defines two cavities 207 for receivingly engaging two carriers 204. As discussed above, equivalent alternative embodiments of the present invention contemplate one or more carriers 204 per shelf 206.

The portion of the frontend opening 412 that is not part of the cavities 207 can be advantageously used to receivingly engage one or more electrical components that are used as necessary to electrically connect the data storage devices 104 in the MDA 201 (FIG. 3). In FIG. 10, for example, the cavities 420 are suited for receiving a respective data storage device controller 421 (FIG. 4). In equivalent alternative embodiments other electrical components can be inserted through the frontend opening 412, such as but not limited to a power supply unit, an interface unit, and a battery unit, with appropriate partitioning.

FIG. 11 is a rear isometric view of the shelf 206 comprising a second partition defining one or more cavities for receivingly engaging an electrical component in an operable relationship through the backend opening 414. Preferably, the cavities of the second partition are adapted for receivingly engaging different types of control components. The cavities can be adapted to receive electrical components such as, but not limited to, a data storage device controller, a power supply unit, an interface unit, and a battery unit. In the illustrative example of FIG. 11 the backend partition 422 defines: cavities 424 adapted for receivingly engaging a power supply unit 425 (FIG. 4); cavities 426 adapted for receivingly engaging a battery unit 427 (FIG. 4); and cavities 428 adapted for receivingly engaging an interface unit 429 (FIG. 4) for each of the respective MDAs 201.

The shelf 206 further comprises a backplane support 430 adapted for supporting a backplane 432 between the frontend and backend partitions 416, 422 in a medial portion of the passage 402. The backplane 432 is configured for electrical connections on both sides thereof. For the illustrative example of FIGS. 10 and 11, the backplane 432 is configured to align: connectors 434 with the connectors 209 (FIG. 5) of the circuit board 208 (FIG. 5); connectors 436 with the data storage device controllers 421 (FIG. 4); connectors 438 with the power supply units 425 (FIG. 4); connectors 440 with the interface units 429 (FIG. 4); and connectors 442 with the battery units 427 (FIG. 4) when inserted into the respective cavities 207, 420, 424, 426, 428.

The backend partition 422 is attached to the enclosure in a manner making it readily removable from the backend opening 414. This can be done in a number of conventional manners such as with accessible fasteners, latches, slotted joints and the like. Making the backend partition 422 removable provides access to the backplane support 430 for its removal. The backplane support 430 is likewise attached to the enclosure 400 in a manner making it readily removable. This is accomplished in some embodiments by providing supporting portions, such as but not limited to tabs 444, to which the backplane support 430 is attached. In alternative embodiments of the present invention, FIG. 12 illustrates an arrangement wherein the backend partition 422 comprises the backplane support 430. In this arrangement the backplane support 430 is removed with the backend partition 422. This is advantageous in the it permits removing the backend partition 422 with a full compliment of electrical components still electrically connected to the backplane 432. In other words, the backplane 432 can be replaced without having to first disconnect all the electrical components in the backend partition 422.

The embodiments of the present invention contemplate a method for electrically connecting components. The method comprises: providing a shelf defining a tubular closed passage with a frontend opening and a backend opening, and a frontend partition adapted for supporting a first component inserted in the frontend opening; attaching a backplane to a backplane support; removably inserting the backplane support in the backend opening; inserting a removable backend partition adapted for supporting a second component inserted in the backend; inserting the first component in the frontend opening to electrically engage the backplane; and inserting the second component in the backend opening to electrically engage the backplane.

Turning now more particularly to FIGS. 12–18, a novel construction for the enclosure 400 is discussed. Preferably, the opposing sides 404, 406 and 408, 410 are substantially solid conductive members to attenuate electrical noise from devices supported within the enclosure 400, such as radio frequency interference. For this reason, an enclosure formed from sheet metal offers a relatively inexpensive solution. However, typically a light gauge sheet metal material requires a number of stiffening embossments, flanges, gussets and the like to obtain the necessary structural integrity for supporting the load within. These stiffening members can significantly increase the outer size and/or reduce the available passage size of the enclosure. Embodiments of the present invention optimally solve this problem by forming the enclosure 400 as a composite corrugated panel comprising a pair of stacked corrugated panels with opposingly directed stiffening corrugations.

Figure 13:
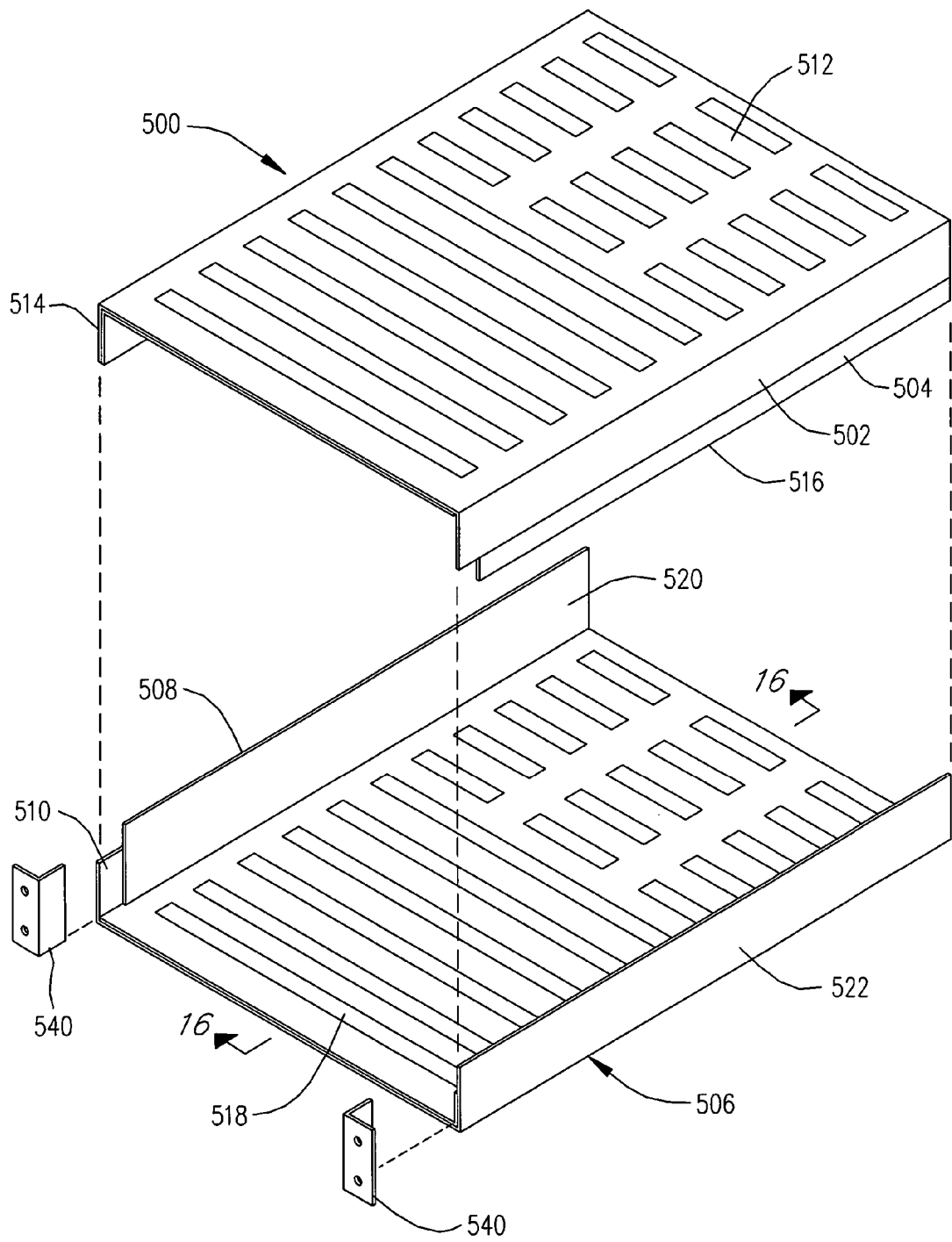
FIG. 13 is an exploded isometric view of the enclosure of FIG. 12.

In some embodiments, the composite corrugated panels can be formed, such as with conventional sheet metal working processes, to define the enclosure 400 with the central passage 402. However, it has been determined that a clamshell construction offers manufacturability advantages. FIG. 13 illustrates a first portion 500 comprising first and second corrugated panels 502, 504 that is attachable to a second portion 506 comprising first and second corrugated panels 508, 510 to form the enclosure 400 (FIG. 12). The first portion 500 comprises a medial web 512 and substantially orthogonal flanges 514, 516 extending from a proximal and distal end thereof. Similarly, the second portion 506 comprises a medial web 518 and substantially orthogonal flanges 520, 522 extending from a proximal and distal end thereof. When the first and second portions 500, 506 are joined, the opposing sides 404, 406 (FIG. 12) are formed from the proximal flanges 514, 520 and 516, 522, and the opposing sides 408, 410 are formed from the webs 512, 518.

Figure 14:
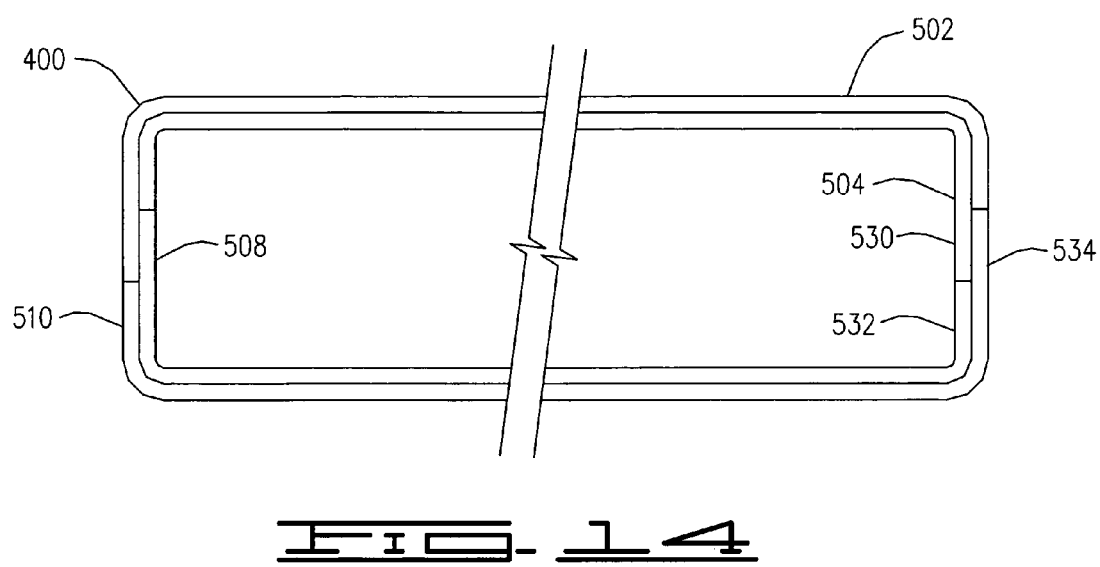
FIG. 14 is an elevational view of the enclosure of FIG. 12.

FIG. 14 is an end view of the enclosure 400 illustrating a preferred manner of varying the lengths of the first and second corrugated panels 502, 504, and 508, 510 that define the flanges 514, 516 and 520, 522 in order to positively position the clamshell portions 500, 506 for attachment while maintaining two material thicknesses throughout. For example, the corrugated panel 504 comprises a relatively longer flange 530 that abuttingly engages a relatively shorter flange 532 of the corrugated panel 508, while slidingly engaging against a relatively longer flange 534 of the corrugated panel 510. A fastener, such as a mechanical, thermal or adhesive type fastener (not shown), can be installed to this overlapping relationship of the flanges 530, 534. This overlapping and abutting engagement of the flanges 530, 532 provides a positive interlocking joint with excellent compression and lateral strength. Also, as illustrated in FIG. 13, the longitudinal lengths of the first and second corrugated panels 502, 504 and 508, 510 can be varied for attachment of flange members 540 for attaching the enclosure 400 to the cabinet 200 (FIG. 3).

Figure 15:
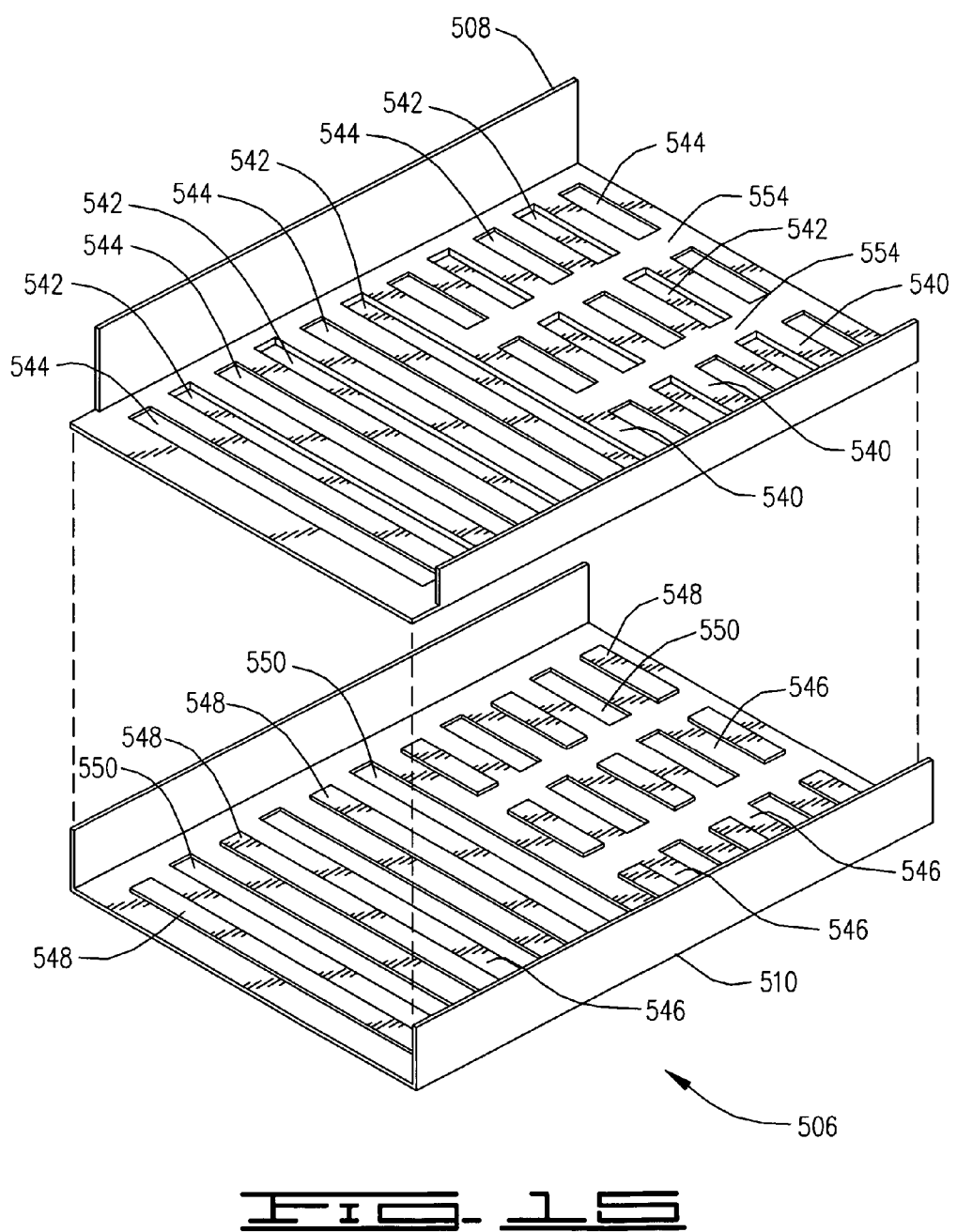
FIG. 15 is an exploded isometric view of a portion of the enclosure of FIG. 13.

FIG. 15 illustrates an exploded view of the portion 506 of the enclosure 400. Although discussion herebelow is limited to the portion 506, it will be appreciated that the other portion 500 is constructed in like structure and manner. The first corrugated panel 508 comprises a reinforced panel structure having a plurality of planar surfaces 540 separating a plurality of embossment surfaces ("bosses") 542 and openings 544. Similarly, the second corrugated panel 510 comprises a reinforced panel structure having a plurality of planar surfaces 546 separating a plurality of bosses 548 and openings 550.

FIG. 16 is a partial cross sectional view taken along the line 16—16 of FIG. of FIG. 13, illustrating the manner in which the panels 508, 510 are stacked in contiguous mating contact of the planar surfaces 540, 546 by the openings 544 of the panel 508 receivingly engaging the bosses 548 of the second panel 510; similarly, the openings 550 of the second panel 510 receivingly engage the bosses 542 of the first panel 508. In this illustrative embodiment, the bosses 542, 548 are opposingly disposed in mating engagement with the respective openings 550, 544. For distributing the load evenly between the panels 508, 510, the bosses 544, 550 are interleaved.

The bosses 542, 548 and respective openings 550, 544 can span the width of the web 518 for maximum strength. Alternatively, the bosses 542, 548 and respective openings 550, 544 can be segmented, as shown at one end of the web 518 in FIG. 15, to provide additional planar surfaces 554 between the segments, such as for providing suitable mounting surfaces for components.

FIG. 17 is an enlarged detail of a portion of FIG. 16. Generally, the embodiments of the present invention contemplate a composite corrugated panel structure comprising a first corrugated panel 508 of a first thickness 558 defining a first corrugation height 560 joined to a second corrugated panel 510 of a second thickness 562 defining a second corrugation height 564. The thicknesses 558, 562 can be the same or different, and the corrugation heights 560, 564 can be the same or different, depending on the required strength and size of enclosure 400 (FIG. 14) needed. The panels 508, 510 can be joined in any of a number of appropriate ways including but not limited to mechanical, thermal, and adhesive fastening methodologies. This arrangement provides an optimal structural integrity with minimal size package; particularly, the composite corrugated panel defines a cross sectional thickness 570 that is preferably less than a sum of the first and second corrugation heights 560, 564.

Embodiments of the present invention contemplate a method for producing a composite corrugated panel, comprising providing a first panel comprising a first corrugation and a first opening; providing a second panel comprising a second corrugation and a second opening; and stacking the panels by disposing the first corrugation in the second opening and the second corrugation in the first opening. The stacking step comprises disposing the corrugations in opposing directions.

Figure 18:
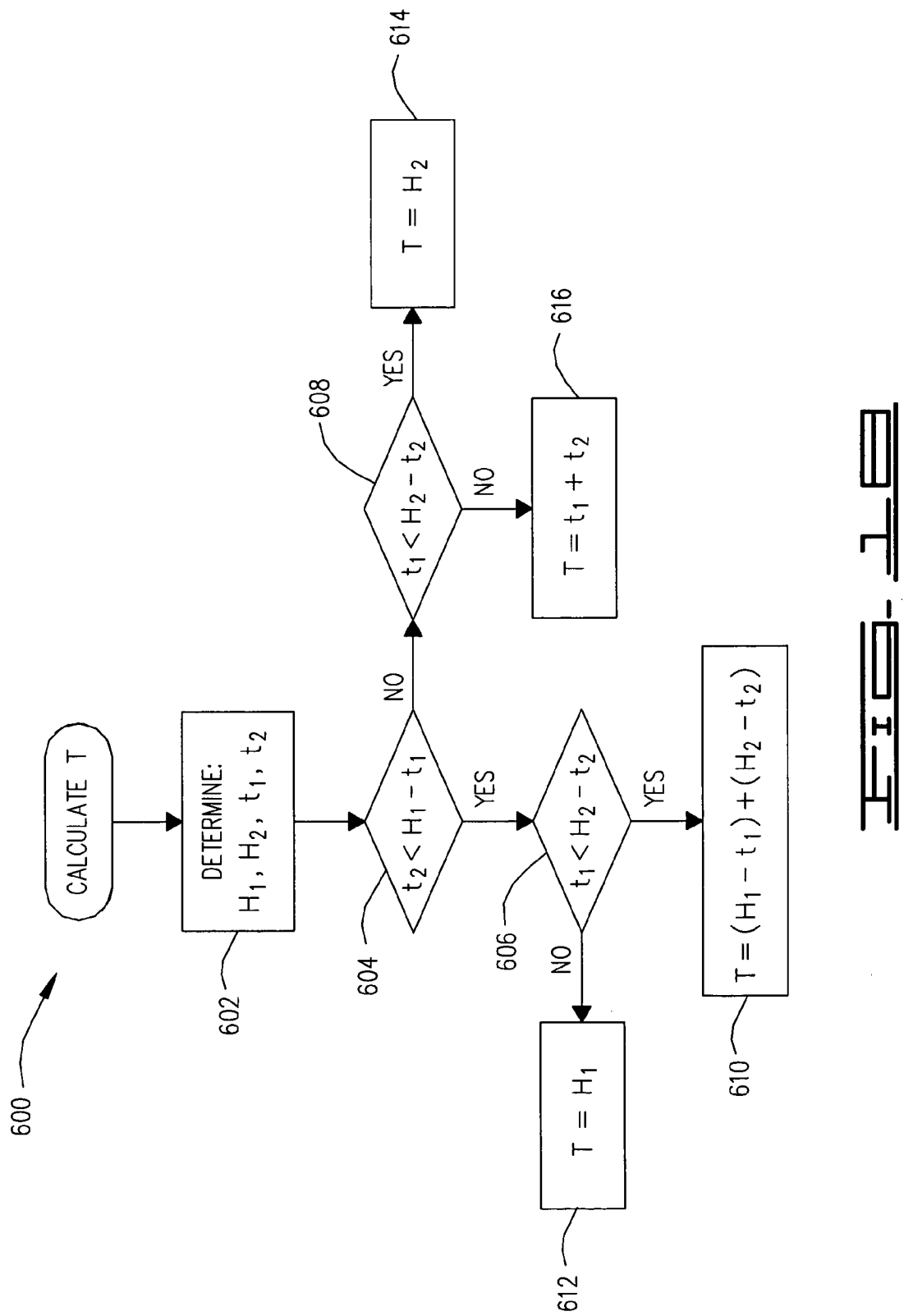
FIG. 18 is a flowchart of a method for modeling a composite corrugated panel in accordance with embodiments of the invention.

FIG. 18 provides a flow chart for a CALCULATE T routine 600 generally illustrative of steps carried out in modeling the thickness 570 ("T") of the composite corrugated panel as a function of the first and second material thicknesses 558, 562 and the first and second corrugation heights 560, 564. The derived thickness 570 can be utilized with conventional beam deflection and shear stress analyses to optimize the design.

The method 600 begins at step 602 by selecting first and second corrugation heights 560, 564 ("$H_1, H_2$") and first and second material thicknesses ("$t_1, t_2$"). These values can be selected within predetermined ranges and the method 600 performed iteratively to determine the optimal values for T.

At decision block 604 it is determined whether the second material thickness 562 is less than the first corrugation height 560 minus the first material thickness 558. If yes, control is passed to decision block 606; else control passes to decision block 608. At decision block 606 it is determined whether the first material thickness 558 is less than the second corrugation height 564 minus the second material thickness 562. If yes, then the composite corrugated panel thickness is modeled in block 610 as the first corrugation height 560 minus the first material thickness 558 plus the second corrugation height 564 minus the second material thickness 562; else the composite corrugated panel thickness is modeled in block 612 as the first corrugation height 560.

At decision block 608 it is determined whether the first material thickness 558 is less than the second corrugation height 564 minus the second material thickness 562. If yes, then the composite corrugated panel thickness is modeled in block 614 as the second corrugation height 564; else the composite corrugated panel thickness is modeled in block 616 as the sum of the material thicknesses 558, 562.

Summarizing generally, the carrier (such as 204) is for componentizing a number of data storage devices (such as 104) in an MDA (such as 201). The carrier is unitarily removable and insertable in a shelf (such as 206) of an array storage system 200. The carrier defines an arrangement of closed channels (such as 218), each channel thereby circumscribing a cross-sectional portion of a data storage device in order to impart lateral supporting engagement thereto in all directions. The data storage device is slidable in the channel in an operable mating relationship with the channel surfaces. The number of channels is associated with the selected number of data storage devices, and the size of the channels is associated with the selected size of the data storage devices.

The carrier supports a circuit board (such as 208) for operatively connecting the selected number of data storage devices in the MDA. The carrier comprises a locating surface (such as 216) adapted to locate the circuit board in alignment with the selected number of channels.

The carrier comprises a compression member (such as 214) extending into the channel for operatively urging the selected number of data storage devices in electrical connection with the circuit board. In some embodiments the compression member comprises a resilient material (such as 240) that is compressingly engageable against the data storage device. Alternatively, the compression member can be adapted for passing a fastener in compressing engagement against the data storage device, or in attaching the data storage device to a channel surface.

In some embodiments the channel is defined by discontinuous opposing channel surfaces (such as 220, 222, 224, 226), such that the channel comprises a first portion that is engageable with a proximal end of the data storage device adjacent the circuit board, and a second portion that is engageable with a distal end of the data storage device.

The carrier can comprise one or more guide members (such as 246) that are adapted for aligning the carrier with a backplane (such as 432). A wrapper (such as 229) can enclose the carrier and/or circuit board for electrical shielding.

Embodiments of the present invention contemplate a method for supporting a data storage device in an array storage system. The method comprises providing a carrier (such as 306) from a plurality of different carriers that is insertable in a shelf supported in the array storage system; the carrier defining an arrangement of channels that each supportingly engage a data storage device, wherein the number of channels is associated with a selected number of data storage devices, and wherein the size of each channel is associated with a selected size of the data storage device, and wherein the different carriers have common volumetric dimensions but varying number and/or size of channels. The method further comprises inserting one or more data storage devices in a respective number of channels in the carrier (such as 308). The method further comprises inserting the carrier in the shelf (such as 310).

The method further comprises the replacing of an existing data storage device in the array storage system, by removing the carrier from the shelf and removing a data storage device from the carrier (such as 316), inserting another data storage device in the carrier (such as 308), and inserting the carrier back in the shelf (such as 310). The method of replacing an existing data storage device in the array storage system can furthermore comprise removing the carrier from the shelf, and inserting a different carrier supporting one or more data storage devices in the shelf (such as 302, 304, 306).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular configuration of the channel surfaces defining the channels without departing from the spirit and scope of the present invention.

What is claimed is:

1. An array storage system comprising a multiple disc assembly with a carrier from a plurality of different carriers differentiated by a characteristic array of tubular closed channels, each channel adapted for supportingly engaging a data storage device.

2. A multiple disc array comprising:
   a partition with channel surfaces defining a passage;
   a circuit board disposed in a plane substantially orthogonal to the passage;
   a data storage device disposed in the passage and supported by the channel surfaces; and
   means for urging the data storage device against the circuit board.

3. The multiple disc array assembly of claim 2 wherein the circuit board is attached to the partition.

4. The multiple disc array assembly of claim 2 wherein the means for urging is characterized by a fastener for attaching the data storage device to a channel surface.

5. The multiple disc array of claim 2 wherein the means for urging is characterized by a cap that is pressingly engageable against a distal end of the data storage device.

6. The multiple disc array of claim 5 wherein the means for urging is characterized by a resilient member between the cap and the data storage device.

7. The multiple disc array of claim 2 wherein the means for urging is characterized by a threaded fastener that is compressingly engageable against the data storage device.

8. The multiple disc array of claim 5 wherein the cap and channel comprise the channel surfaces.

9. The multiple disc array of claim 8 wherein the channel surfaces are discontinuous.

10. A carrier for supporting a circuit board and one or more data storage devices in a multiple disc array, comprising:
    a partition with channel surfaces defining a tubular closed passage, the channel surfaces adapted for circumscribing a cross section of one of the data storage devices in a supporting mating relationship; and
    a biasing member pressingly engaging the data storage device against the circuit board.

11. The carrier of claim 10 wherein the means for urging is characterized by a fastener for attaching the data storage device to a channel surface.

12. The carrier of claim 10 wherein the means for urging is characterized by a cap that is pressingly engageable against a distal end of the data storage device.

13. The carrier of claim 10 wherein the means for urging is characterized by a threaded fastener that is compressingly engageable against the data storage device.

14. The cater of claim 12 wherein the means for urging is characterized by a resilient member between the cap and the data storage device.

15. The carrier of claim 12 wherein the cap and channel comprise the channel surfaces.

16. The carrier of claim 15 wherein the channel surfaces are discontinuous.

17. A method for supporting a plurality of data storage devices in a multiple disc array comprising:

providing a carrier defining an array of tubular closed channels for supportingly engaging data storage devices;

inserting one or more data storage devices in a respective number of channels defining the multiple disc array; and inserting the carrier in a shelf.

18. The method of claim 17 comprising:

removing the carrier from the shelf;

changing the multiple disc array configuration; and re-inserting the carrier in the shelf.

19. The method of claim 18 wherein the changing step comprises inserting another data storage device in a channel.

20. The method of claim 18 wherein the changing step comprises removing a data storage device from a channel.

21. The method of claim 18 wherein the changing step comprises providing a different carrier, and the re-inserting step comprises re-inserting the different carrier in the shelf.

* * * * *